United States Patent [19]

Rauwendaal

[11] 4,129,386
[45] Dec. 12, 1978

[54] EXTRUSION APPARATUS

[75] Inventor: Christiaan J. Rauwendaal, Asheville, N.C.

[73] Assignee: Akzona Incorporated, Asheville, N.C.

[21] Appl. No.: 811,337

[22] Filed: Jun. 29, 1977

Related U.S. Application Data

[63] Continuation-in-part of Ser. No. 691,940, Jun. 1, 1976, which is a continuation-in-part of Ser. No. 585,925, Jun. 11, 1975, abandoned.

[51] Int. Cl.² .......................... A21C 1/06; B01F 7/08
[52] U.S. Cl. ........................................ 366/88; 366/89; 366/99; 366/323; 425/208
[58] Field of Search ................ 366/79, 88, 89, 99, 366/279, 318, 320–324, 327; 198/661, 670; 425/207–209; 100/145

[56] References Cited

U.S. PATENT DOCUMENTS

| | | | |
|---|---|---|---|
| 3,689,182 | 9/1972 | Kovacs | 366/323 |
| 3,698,541 | 10/1972 | Barr | 366/88 |
| 3,858,856 | 1/1975 | Hsu | 366/88 |
| 3,867,079 | 2/1975 | Kim | 366/88 |
| 3,905,588 | 9/1975 | Reinhart | 366/88 |
| 3,924,842 | 12/1975 | Klein | 366/79 |
| 4,015,832 | 4/1977 | Kruder | 366/89 |

Primary Examiner—Harvey C. Hornsby
Assistant Examiner—Timothy F. Simone
Attorney, Agent, or Firm—Tom R. Vestal; Francis W. Young

[57] ABSTRACT

A new extruder screw design incorporating an optimal flight helix angle and flight height in the feed section and metering section and a constantly varying helix angle with a constantly decreasing flight height in the transition section is disclosed; the screw being efficiently fed by use of a grooved section of extruder barrel in the area of the feed section.

19 Claims, 11 Drawing Figures

EXTRUSION APPARATUS

CROSS-REFERENCE TO RELATED APPLICATIONS

This is a continuation-in-part of application Ser. No. 691,940 filed June 1, 1976, which is a continuation-in-part of application Ser. No. 585,925 filed June 11, 1975, now abandoned.

BACKGROUND OF THE INVENTION

This invention relates to a novel extrusion apparatus and particularly to an improved design of the extruder barrel and screw to be used in a single screw extruder fed with solid material rather than melted material.

The efficiency of an extruder screw is determined by the manner in which the material is conveyed by the screw under controlled temperature and pressure conditions with sufficient mixing to produce a homogeneous melt at the end of the screw.

In the single screw extrusion process, the chips or particulate solids are conveyed forward by the screw by way of friction between the chips, the barrel, and the screw. The process is such that it is preferred that the coefficient of friction between the chips and the barrel is greater than that between chips and the screw. Conditions can exist where the chips will slip against the barrel and rotate with the screw and will not advance. The most effective method of overcoming this problem is to design the extruder in such a manner as to ensure sufficient friction within the feed section. One such method involves altering the normally smooth barrel wall within the feed section (usually 2 to 3 barrel diameters). Such designs would include grooves, splines, tapered splines, randomly located indentations or barriers.

In a plasticizing extruder screw, there are at least three major geometrical sections: feed, transition, and metering. The three major geometrical sections correspond more or less to the three functional sections of the screw. These functions are solids conveying, melting and melt conveying. Solids conveying occurs in the feed section, although some melting may begin in this section. The melting occurs mainly in the transition section, although the melting is not necessarily completed at the end of this section. The melt conveying occurs in the metering section, although melting can continue in this section.

While the geometrical sections of the extruder screw are fixed, the functional sections are not fixed. These boundaries will shift, depending on the material extruded, the operating conditions, and other parameters. Sometimes, other geometrical sections are included to perform special functions such as mixing, devolatilizing and the like.

Other variations of extruder screws include those containing internal heat pipes for heat transfer from metering section to feed section, a decompression section to control melt temperature, an internal screw for melt removal, or an internal screw for solids recirculation. The "Barr" screw (U.S. Pat. No. 3,698,541), uses, for example, a double flight to separate melted resin from unmelted granules in an extrusion process and this results in an improved extrusion over conventional square pitch extrusion screws.

Prior art screw designs vary considerably according to the processing application required. The screw usually has one or two metal ridges or "flights" wrapped like a large screw thread around a cylindrical "core". The helix angle of the flight is conventionally constant throughout the three sections with the angle of 17.66° (a "square pitch," where pitch equals diameter) being very common; but it is also known in the art to change the helix angle using one angle in a given section and another angle in another section.

In almost all applications, the efficiency of an extruder can be improved by proper design. A mathematical description of solid conveying in the feed section is discussed by W. H. Darnell and E. A. J. Mol ("Solids Conveying in Extruders" SPE Journal, April 1956) and others. The Darnell/Mol model is based on solid-to-solid friction between the solid plug and the surrounding metal surfaces (barrel, screw core, trailing, and leading screw flight).

Optimization of the geometry of the feed section is difficult because it depends on the values of coefficients of the friction. The coefficients of friction are not constant, but change with temperature, pressure, velocity, and the like. Therefore, an average value of the coefficient is usually used for simplicity. For most plastics, the coefficient of friction is approximately 0.25 to 0.5. Using the values 0.25 to 0.5 for coefficient of friction and the solid conveying theory, curves can be determined on output vs. helix angle. Maximum outputs will be obtained at certain values of the helix angle depending on the value of the coefficient of friction, the diameter of the screw, and the channel flight height in the feed section.

A mathematical model of the melting in the extruder screw is given by Tadmor and Klein (see *Engineering Principles of Plasticating Extrusion,* Van Nostrand Reinhold Company, 1970, Chapter 5). This model can be used only with a sophisticated computer program because the calculation is made by an iterative process. The usefulness of this model lies mostly in the simulation of extruder screw with a constant helix angle and uninterrupted flights. In other screw designs, the usefulness of the model is questionable.

Ernest C. Bernhardt (*Processing of Thermoplastic Materials,* Reinhold Publishing Corporation, New York, 1959, page 212) discusses optimization of the melt flow through the metering section.

Until now, no one has applied all the optimization theories above discussed to a single extruder screw in the manner described herein, for the resultant screw dimensions fall outside the presently accepted norms. For example, the flight height ratio between the feed and the metering sections is much higher than present conventional screw design theories accept.

SUMMARY OF THE INVENTION

In accordance with this invention, a novel extruder apparatus designed to be fed with solid thermoplastic material such as polyamide or polyester is provided with a grooved barrel wall within a first portion of the feed section of the solid conveying area of the extruder screw. An extruder screw is provided where the flight helix angle and the flight height in the feed section is constant, the specific angle being calculated in accordance with the properties of the material being extruded. The feed section helix angle value ranges from about 10° but below 25°, with the most preferred angle being about 15° to 20°. Unlike previously known screws, the transition section has a helix angle which constantly increases from the helix angle of the feed section to the helix angle of the metering section, and a flight height which constantly decreases. The helix angle of the metering section is constant with a representative range of greater than 25° but less than 35° and the flight height is constant therein.

The concept of a grooved barrel in combination with a screw having a helix angle in the transition zone varying from that of the feed section to that of the metering section may be applied to a variety of screw designs such as internally heated screws, screws with decompression sections, screws with internal screws for melt removal, screws with internal screws for solids re-circulation, various double flighted screws and combination of these designs.

It is necessary to size the grooved throat in the feed zone to prevent buildup of excessive pressure gradients inside the barrel along the extruder since pressure gradients along the barrel and screw create forces which act laterally on the screw. As the pressure gradient becomes great, the forces acting on the root of the screw cause a deflection of the screw between bearing surfaces. Excessive pressure gradients will deflect the flight of the screw into the barrel causing abnormal stress and wear on the flight and barrel. It is understood that the pressure pattern along the screw in the thermoplastic plug is determined by the characteristics of the screw design, operating conditions and properties of the polymer and that the initial pressure in the feed section for a given screw will influence the amount of deflection.

Deflection of the extruder screw may be minimized by sizing the feed rates from the grooved throat to the flight height ratio—either by increasing or decreasing the feed rate to adjust the initial pressure or by adjusting the flight height ratio and rate of incremental change to avoid subsequent excessive deflection differential pressures. The deflection may also be minimized by modifying the incremental increase in the transition zone to avoid pressure gradients in this zone. The approach taken will depend upon the individual solution being attempted by a skilled artisan to maximize the output of the extruder and avoid abnormal wear conditions.

BRIEF DESCRIPTION OF THE DRAWINGS

The invention will now be further described with reference to the appended drawings.

DESCRIPTION OF THE PREFERRED EMBODIMENTS

Figure 1:
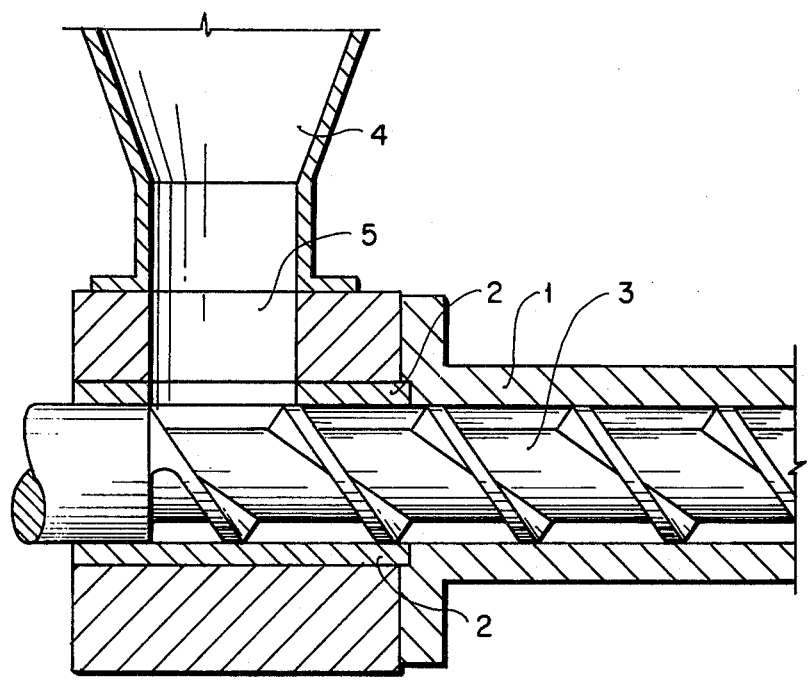
FIG. 1 is a longitudinal cross section of a grooved barrel, single screw extruder showing only approximately the feed section.

Referring to the FIG. 1, there is shown a cross section of a single screw extruder which consists basically of a steel cylinder or barrel 1 which is fitted in the feed section with a grooved liner 2 (see FIG. 2 for cross section of grooved liner) in which a solid or cored screw 3, running the entire length of the cylinder (now shown) is rotated. Thermoplastic granules are fed from the hopper 4 through the feed throat 5 to the rotating screw 3 where they become fully melted as they are forced along the length of the screw.

Figure 2:
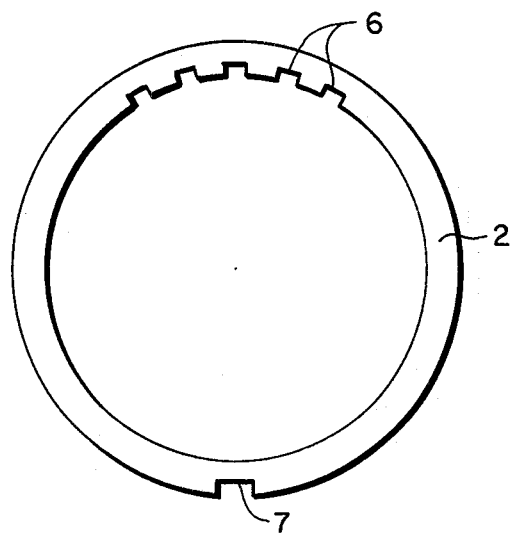
FIG. 2 is a cross section of the grooved liner.

Referring to FIG. 2, a cross section of the grooved liner 2 of FIG. 1 is shown. Grooves 6 are formed longitudinally on the inner surface of the liner and extend the length of the liner and parallel with axis. Slot 7 is provided on the outer surface of the liner for fixation.

Figure 3:
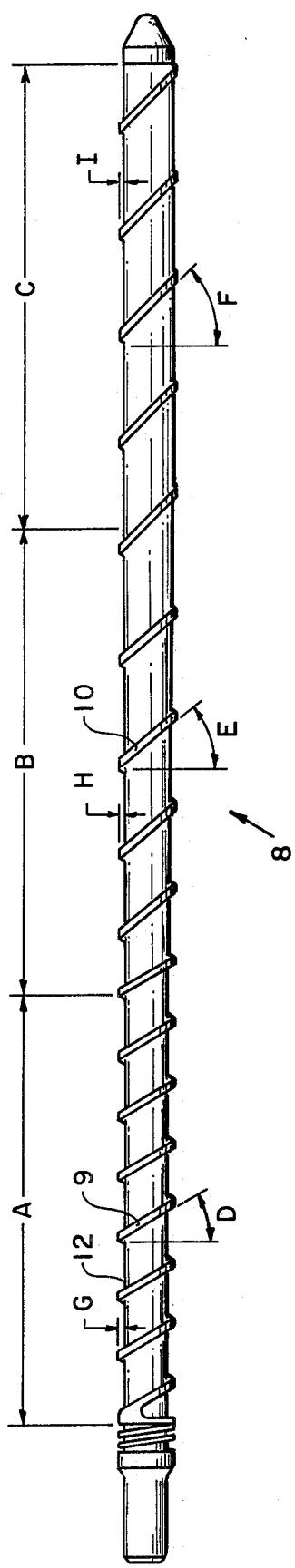
FIG. 3 is a longitudinal cross section of a screw constructed in accordance with one embodiment of this invention.

Referring to FIG. 3, the extruder screw 8 of this invention has a feed section A, a transition section B, and a metering section C. The optimum helix angle D of the flight 9 in the feed section A is about 20° for polyesters and polyamides. The helix angle E of the flight 10 in the transition section B constantly increases from the angle D to the angle F of the flight 11 in the metering section C. The optimum helix angle F is about 30° for liquid or molten materials including polyamides and polyesters. The feed section A has a constant flight height G between the screw core 12 and the top of the flight 9, the metering section C has a constant flight height I, and the transition section B has a constantly decreasing flight height from the feed section flight height G to the metering section flight height I.

Figure 4:
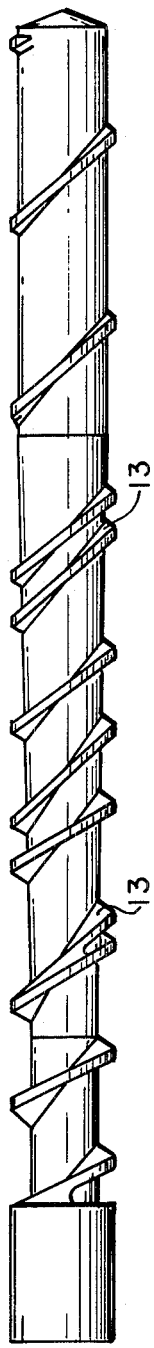
FIGS. 4 through 8 are longitudinal cross sections of screws constructed in accordance with other embodiments of this invention.

Referring to FIG. 4, a barrier flight screw is shown wherein a barrier flight 13 forms a physical separation between solid and molten material. The melt is collected in a melt channel of constantly increasing width.

Figure 5:
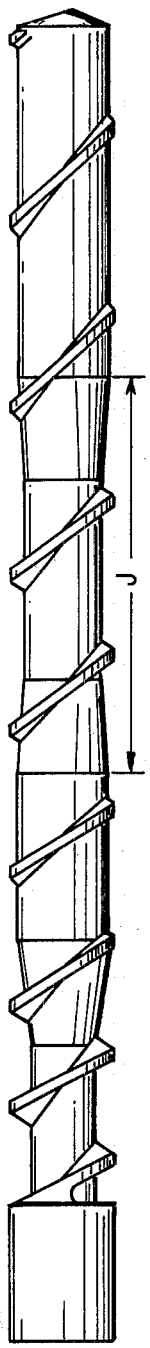

Referring to FIG. 5, a single flight decompression screw is shown wherein the core diameter decreases and again increases within a section J between two sections (metering) of constant core diameter. The core diameter reduction within J allows control of shear and thereby control of the temperature of the extrusion material allowing a higher output without exceeding a maximum temperature for a heat sensitive material.

Figure 6:
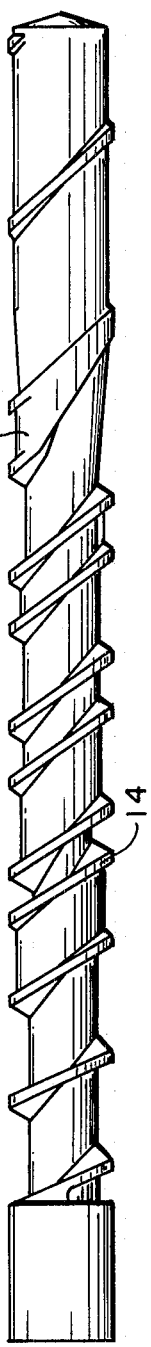

Referring to FIG. 6, a barrier flight screw is shown wherein a barrier flight 14 forms a physical separation between solid and molten material. The melt is collected in a melt channel of constantly increasing depth.

Figure 7:
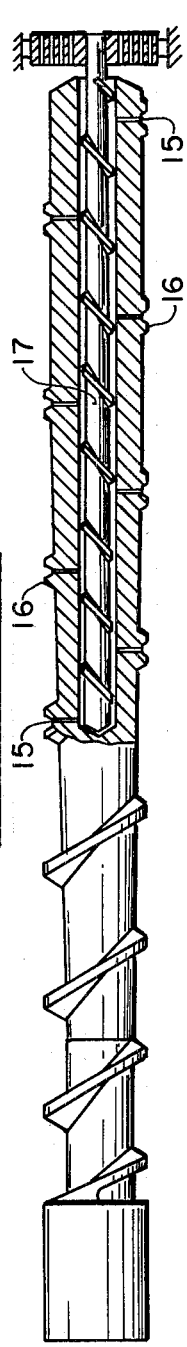

Referring to FIG. 7, a screw is shown wherein a portion of the melted material is removed through openings 15 in the main screw flights 16 which are adapted in shape for allowing polymer to flow to and through the openings 15 and to the inner stationary screw 17 thereby allowing an increase in the output of molten material.

Figure 8:
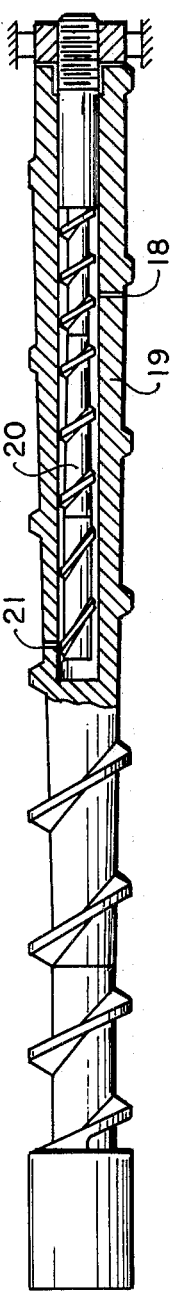

Referring to FIG. 8, a screw is shown wherein a portion of the solid material is removed through openings 18 in the main screw core 19 and fed to a stationary plasticating inner screw 20 where it is melted and fed through openings 21 back to the main screw channel, thus allowing an increase in melting capacity.

Returning to the screw of FIG. 3, the optimum helix angle D in the feed section A of about 20° is calculated using values of 0.25 to 0.5 for the coefficient of friction and the solid conveying theory as previously described. When operating conditions and accurate data on the coefficient of friction are known, the optimum helix angle D can be determined precisely; however, if the operating conditions change, the optimum helix angle will change.

The geometry of the transition section B should be such that melting occurs in the most efficient way. The larger the solid-melt interface area, the better melting will be. This is achieved in the present invention by the use of a wide, shallow channel in the transition section B. The flight height decreases from a maximum along the feed section A to a minimum at the beginning of the metering section C. The wide channel is obtained by increasing the helix angle from a minimum D at the end of the feed section A to a maximum F at the beginning of the metering section C.

The ratio of the flight height G in the feed section A to the flight height I in the metering section C which is preferred in the present invention is about 1.5 to 2 times greater than for a square pitch screw operating under the same conditions. This flight height ratio is dependent on two factors: the solid conveying rate, and the melt conveying rate. When the bulk density (mass divided by the total volume of the solid particles and the voids or open spaces between them) of the feed material is low compared to the melt density, the flight height ratio will be high. The use of a grooved barrel section in the feed section allows lower flight height ratios than with a smooth barrel surface. With a ratio of bulk density (at atmospheric pressure) to the melt density of about 2 to 3, and no grooved barrel section is present, the flight height ratio can be about 2 to 1 or greater with a ratio of about 4 to 1 being preferred. When a grooved barrel is present and the ratio of bulk density at atmospheric pressure to the melt density is about 2 to 3, then the flight height ratio can be about 2 to 1 or greater with a ratio of about 3 to 1 being preferred.

When the ratio of bulk density at atmospheric pressure to melt density is lower than about 2 to 3, then higher flight ratios are required. When the ratio of bulk density at atmospheric pressure to the melt density is higher than about 2 to 3, lower flight height ratios can be used. The above statements assume gravity feed; if forced feeding is used, even smaller flight height ratios can be used.

Figure 9:
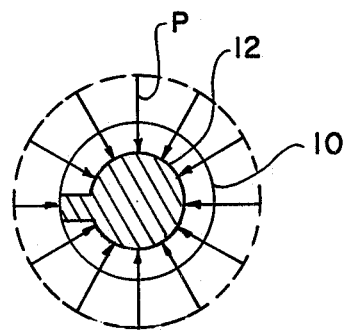
FIGS. 9 through 11 depict pressure gradients and their reaction on the screw.
Figure 10:
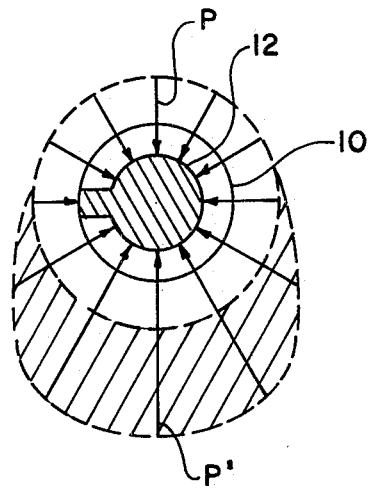
Figure 11:
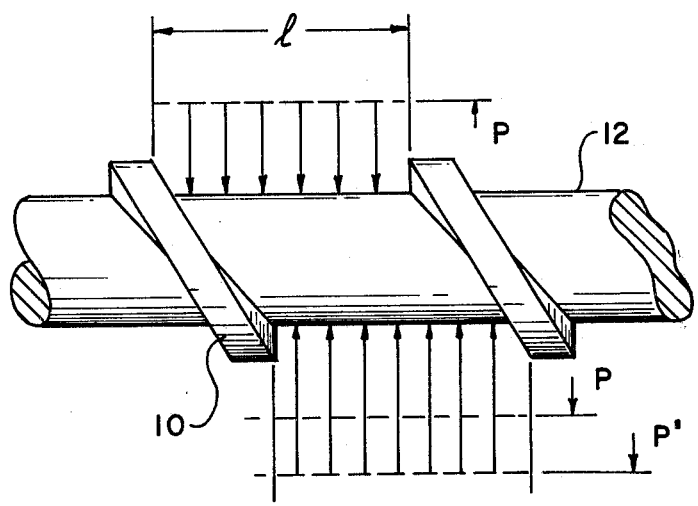

FIGS. 9, 10 and 11 are sections of the screw of FIG. 3 and have superimposed thereon pressures to depict how lateral forces cause deflection of the screw.

In FIG. 9, arrows circumscribing the root 12 show a balanced pressure condition of magnitude P around the root 12 between the helix of flight 10. In such a balanced condition there are minimal lateral forces to deflect the screw.

In FIGS. 10 and 11, an unbalanced condition is shown in which a pressure P exists at the top of the root which a greater pressure P' exists at the bottom of the root, creating a pressure gradient that goes from 0 at the top of the root 12 to (P'−P) at the bottom of root 12. Assuming that the pressure gradient along the root between flight helices is essentially zero, the incremental lateral force acting to deflect would be substantially (P'−P) ($\delta\theta$)$l$ where $l$ is the distance between the flight helices and $\delta\theta$ is the incremental surface of the root 12 over which P' and P act.

Following are representative examples illustrating the use of this invention.

EXAMPLE I

Polyamide resin granules were extruded using a DavisStandard 2 in. extruder with a 15 horsepower drive. The extruder barrel was of conventional design (not grooved) and the extruder screw was of conventional design with a constant "square pitch" helix angle of 17.66° and a length to diameter ratio of 20/1. The following parameters were recorded: output, 66.3 pounds per hour; screw speed, 120 rpm; die head pressure, 2,000 psi; melt temperature, 273° C. This resulted in a conveying efficiency of 0.55 lb/hr/rpm.

EXAMPLE II

Polyamide resin granules were extruded as in Example I except that the extruder screw was replaced by a variable pitch screw with the design of this invention (see FIG. 3). The following parameters were recorded: output, 65.9 lb/hr; screw speed 75 rpm; die head pressure, 2,000 psi; melt temperature 271° C. This resulted in a conveying efficiency of 0.88 lb/hr/rpm.

EXAMPLE III

Polyamide resin granules were extruded with a Sterling 4.5 in. extruder with a 125 horsepower drive. The extruder barrel was of conventional design (not grooved) and the extruder screw was of conventional design with a constant "square pitch" helix angle of 17.66° and a length to diameter ratio of 24/1. The following parameters were recorded: output, 661 lb/hr; screw speed 80 ± rpm; die head pressure, 2,000 ± 50 psi; melt temperature 263° ± 7° C. The maximum output was 845 lb/hr at a screw speed of 114 rpm giving a conveying efficiency of 7.41 lb/hr/rpm.

EXAMPLE IV

Polyamide resin granules were extruded as in Example III except that the extruder barrel was fitted with a grooved liner in the feed section (see FIGS. 1 and 2) and the extruder screw was replaced by a variable pitch screw with the design of this invention (see FIG. 3). The following parameters were recorded: output, 661 lb/hr; screw speed, 74 ± rpm; die head pressure 2,000 ± 15 psi; melt temperature 263° ± 3° C. The maximum output was 1,148 lb/hr at a screw speed of 114 rpm giving a conveying efficiency of 10.07 lb/hr/rpm.

Results from these experiments using grooved throat liners and variable helix angle screws incorporating the design of this invention have confirmed the theoretical predictions from computer simulation runs. Further, the extrusion stability has been shown to be excellent as a result of the present invention; far better than that with a conventional screw. In addition, variation in pressure and temperature is smaller, indicating a better mixing and homogenization capability over conventional screws. Thus, the present invention improves output and extrudate quality.

What is claimed is:

1. An extrusion apparatus for processing a thermoplastic resin comprising a barrel portion with grooves within the feed section and an extruder screw extending the length of the barrel and having in sequence from the feed section end, a feed section, a transition section, and a metering section; the core of said screw being helically wound with a flight of constant helix angle in the feed section, the helix angle being between 10° and 25°, the helix angle of the flight in the metering section being constant and between 25° and 35° and the helix angle in the transition zone constantly increasing from the helix angle of the feed section to the helix angle of the metering section.

2. The apparatus of claim 1 wherein the helix angle of the flight in the feed section is about 20°.

3. The apparatus of claim 1 wherein the helix angle of the flight in the metering section is about 30°.

4. The apparatus of claim 1 wherein the helix angle of the flight in the transition section uniformly varies from about 20°, that at the end of the feed section, to about 30°, that at the beginning of the metering section.

5. The apparatus of claim 1 wherein the height of the flights in the feed and metering sections are constant throughout each section, the flight height in the feed section being greater than the metering section flight height and the flight height in the transition section varying uniformly from the feed section flight height to the metering section flight height.

6. The apparatus of claim 5 wherein the ratio of the flight height of the feed section to the flight height of the metering section is about 2 to 1 or greater for polyamides and polyesters with a ratio of bulk density at atmospheric pressure to the melt density of about 2 to 3.

7. An extruder screw for use in processing a thermoplastic resin, comprising a shaft having in sequence a feed section, a transition section, and a metering section, a screw flight beginning in said feed section and ending in said metering section, said screw flight being helically wound and attached to said shaft, the helix angle in the feed section of said screw flight being constant and between 10° and 25°, the helix angle in the metering section being constant and between 25° and 35°, the helix angle in the transition section varying from the helix angle of the feed section to the helix angle of the metering section.

8. The extruder screw of claim 7 wherein the helix angle of the flight in the feed section is about 20°.

9. The extruder screw of claim 7 wherein the helix angle of the flight in the metering section is about 30°.

10. The extruder screw of claim 7 wherein the helix angle of the flight in the transition section uniformly varies from about 20°, that at the end of the feed section, to about 30°, that at the beginning of the metering section.

11. The extruder screw of claim 7 wherein the height of the flight in the feed and metering sections are constant throughout each section, flight height in the feed section being greater than the metering section flight height, and the flight height in the transition section varying uniformly from the feed section flight height to the metering section flight height.

12. The extruder screw of claim 7 wherein the ratio of flight height of the feed section to the flight height of the metering section is about 2 to 1 or greater for polyamides and polyesters with a ratio of bulk density at atmospheric pressure to the melt density of about 2 to 3.

13. The extruder screw of claim 7 wherein a barrier flight is provided forming a physical separation between solid and molten material, the melt collecting in a channel of constantly increasing width.

14. The extruder screw of claim 7 wherein a barrier flight is provided forming a physical separation between solid and molten material, the melt collecting in a channel of constantly increasing depth.

15. The extruder screw of claim 7 wherein a decompression zone (decreasing followed by increasing core diameter) is provided within the metering section.

16. The extruder screw of claim 7 wherein openings in the main screw flights are provided for passage of a portion of the melted material to an internal, stationary screw.

17. The extruder screw of claim 7 wherein openings are provided in the main screw core for passage of a portion of the unmelted material to a stationary plasticating inner screw which also may be of the design of the screw of claim 7 and feeds molten material through openings in the main screw to a channel portion containing molten material.

18. An extrusion apparatus for processing a thermoplastic resin comprising a barrel portion with grooves within the feed section and an extruder screw extending the length of the barrel and having in sequence from the feed section end, a feed section, a transition section, and a metering section; the core of said screw being helically wound with a flight of constant helix angle in the feed section, the helix angle being between 10° and 25°, the helix angle of the flight in the metering section being constant and between 25° and 35° and the helix angle in the transition zone constantly increasing from the helix angle of the feed section to the helix angle of the metering section; the length and number of the grooves in the metering section being determined to supply substantially the maximum feed rate of thermoplastic resin to the transition and metering sections without deflecting the extruder screw into the barrel.

19. The apparatus of claim 18 wherein the pressure gradient along the screw flight is less than the maximum deflection differential pressure.

* * * * *